No. 720,065. PATENTED FEB. 10, 1903.
I. W. PIKE.
APPARATUS FOR COOLING COKE, &c.
APPLICATION FILED MAY 1, 1902.
NO MODEL.
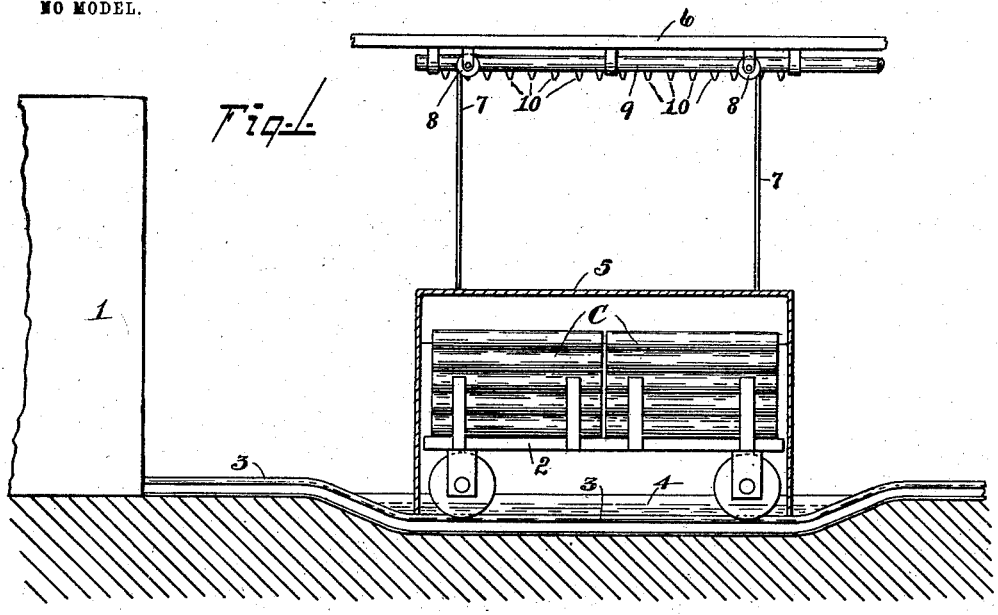
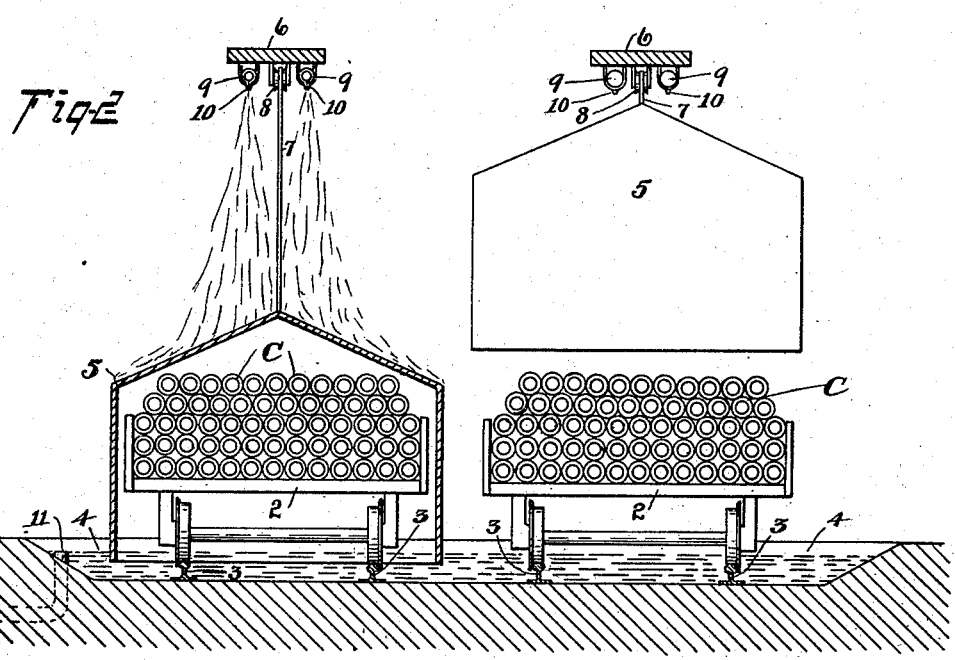
WITNESSES:
Isaac W. Heysinger.
Walter C. Pusey.
INVENTOR:
Irvin W. Pike,
BY
Joshua Pusey.
ATTORNEY.

UNITED STATES PATENT OFFICE.

IRWIN W. PIKE, OF KEYPORT, NEW JERSEY.

APPARATUS FOR COOLING COKE, &c.

SPECIFICATION forming part of Letters Patent No. 720,065, dated February 10, 1903.

Application filed May 1, 1902. Serial No. 105,439. (No model.)

*To all whom it may concern:*

Be it known that I, IRWIN W. PIKE, a citizen of the United States, residing at Keyport, Monmouth county, New Jersey, have invented certain new and useful Improvements in Apparatus for Cooling Coke, &c., of which the following is a full, clear, and exact description, reference being had to the accompanying drawings, of which—

Figure 1 is a sectional side elevation; Fig. 2, an end view, partially in section, showing one of the hoods elevated above the coke-carrying truck and another in section inclosing a truck and contents and its lower edge beneath the level of the water in the tank.

The object of this invention, broadly stated, is to provide simple and convenient means or apparatus for sealing hot coke or other heated material against the admission of air while the same is being cooled.

The invention is more especially designed and adapted for treating coke made from peat, which takes fire and is consumed if exposed to the air while hot.

A leading feature of the invention also comprises a trackway, a truck for containing the heated material and adapted to run on said trackway, a tank containing water, into and out of which tank said trackway passes, and a hood closed except at the bottom and adapted to be passed over said truck and its lower end submerged in the water in said tank, whereby the interior of the hood is sealed against the admission of air.

The invention also comprises means for flooding or sprinkling water upon said hood when in place, as mentioned, whereby the said material within the same will be more rapidly cooled.

The invention relates, further, to certain details of construction hereinafter pointed out.

Referring to the accompanying drawings, which represent my invention as applied to the treatment of coke immediately after the same is removed from the coking-oven, 1, Fig. 1, denotes a coking-oven in which the material to be coked is piled upon wheeled trucks 2, that are adapted to run over a trackway 3, leading into the oven. In carrying out my invention I extend this trackway into and thence out of a pan-like depression or tank 4 adjacent to the oven and adapted to hold water, the length and width of said tank or depression being greater than the length and width of the truck.

5 is a hood, of sheet metal or the like, that is made practically air-tight, except that the bottom is open and is adapted to pass over and inclose the sides and ends of the truck.

In using my device the truck, with the hot coke C thereon—such as peat-coke in the present instance, which is made in tubular form—is passed out of the oven onto the trackway 3, thence into the tank 4, which is charged with water. The hood is now placed over the truck, and its lower end is allowed to enter the water. Thus the interior of the hood becomes sealed against the ingress of air. In order to be able to quickly and conveniently manipulate the hood to pass it over and elevate the same from the truck, I suspend the same from an overhead beam 6 by ropes or chains 7, passing over suitably-located pulleys 8, journaled in brackets that are secured to the beam 6, as shown. By this means the hood may be lowered and raised as required.

In order to accelerate the cooling of the coke, I employ an overhead pipe or pipes, that are supported by said beam 6 and communicate with a source of water-supply. These pipes are provided with orifices or sprinklers 10 at such points that the water will be delivered upon the top of the hood, as illustrated in Fig. 2. I usually make the hood in the form of a gable-roof, as shown. The water running off the top passes down over the sides of the hood and thence into the tank 4. Thus the hood and its contents will be the more rapidly cooled, and a supply of water will always be maintained in the said tank. In order to prevent any excess of water from flowing over the top of the tank, and thus flooding the ground adjacent thereto, I usually employ an overflow-pipe 11. When the coke has sufficiently cooled, the hood is elevated to a plane above the truck and contents, and it (the truck) is pushed forward on the trackway out of the tank onto the level and unloaded.

I remark that there may be two or more coking-ovens side by side, in which case I would have the water-containing depression 4 of suitable dimensions to receive trackways leading from the several ovens, as seen in Fig. 2, wherein I have shown two such trackways with trucks thereon in a common tank. I further remark that although usually I would employ a truck adapted to run on a trackway leading into and out of the water-containing tank I do not wish to be understood as limiting myself thereto, as the only essentials of the invention are a water-containing tank or the like, a receptacle for the hot material to be treated, and a hood inclosing said receptacle and contents and having the open bottom submerged in the water in said tank.

Having thus described my invention, I claim as new and desire to secure by Letters Patent—

1. In an apparatus of the character recited, the combination of the water-containing tank, the trackway leading into and out of said tank, the truck upon said trackway, the hood closed except at the bottom and inclosing the top, sides and ends of said truck, and having its lower end beneath the surface of the water in said tank, substantially as and for the purpose set forth.

2. In an apparatus of the character recited, the combination of the water-containing tank, the trackway leading into and out of the same, the truck upon said trackway, the hood closed except at the bottom, and inclosing the top, sides and ends of said truck, and having its lower end beneath the surface of the water in said tank, together with means for flowing water over said hood, substantially as and for the purpose set forth.

3. In an apparatus of the character recited, the combination of the water-containing tank, the trackway leading into and out thereof, the truck adapted to travel on said trackway, the hood closed except at the bottom, adapted to inclose said truck, and suspended over said tank and the trackway therein, together with means for lowering and raising said hood, substantially as and for the purpose set forth.

4. In an apparatus of the character recited, the combination of the water-containing tank, the movable truck or receptacle for containing the material to be treated, and adapted to be passed into and out of said tank, the hood open at the bottom only and means for retaining the same normally in the elevated position to permit the passage of the truck or receptacle thereunder, and for lowering said hood to cause the same to inclose the latter and its lower end to enter the water in said tank, substantially as and for the purpose set forth.

5. In an apparatus of the character recited, the combination of the oven, the water-containing tank adjacent thereto, the trackway leading from said oven into and out of said tank, the truck adapted to travel on said trackway and the hood normally suspended above said trackway and adapted to be lowered to cause the same to inclose the truck and its lower end to enter the water in said tank when said truck is brought into position beneath said hood, substantially as and for the purpose set forth.

In testimony whereof I have hereunto affixed my signature April 28, A. D. 1902.

IRWIN W. PIKE.

Witnesses:
WM. B. G. ALLEN,
EDW. A. SCHUTTE.